Patented Oct. 16, 1923.

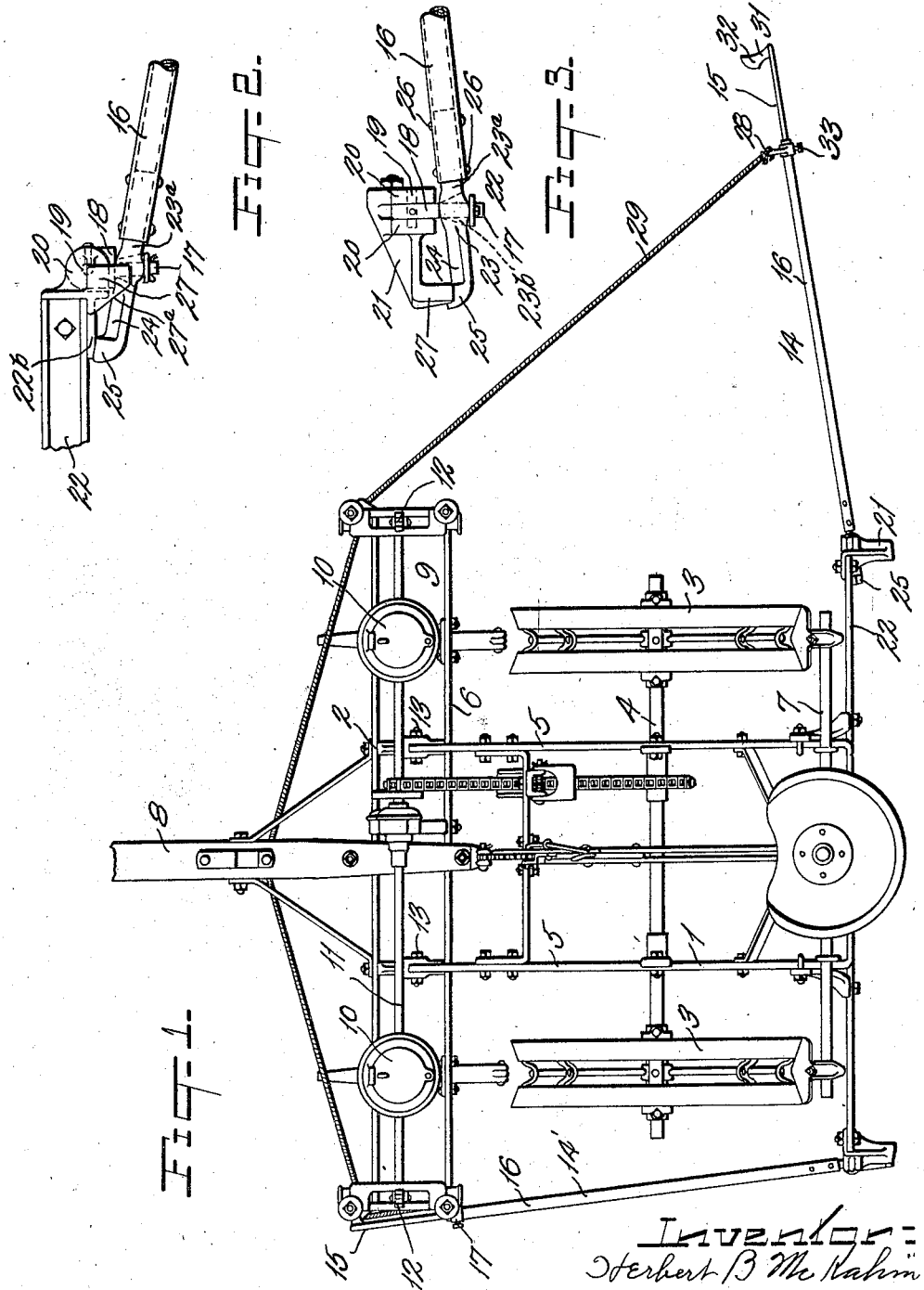

1,471,182

UNITED STATES PATENT OFFICE.

HERBERT B. McKAHIN, OF MOLINE, ILLINOIS, ASSIGNOR TO DEERE & COMPANY, OF MOLINE, ILLINOIS, A CORPORATION OF ILLINOIS.

MARKER DEVICE FOR PLANTERS.

Application filed November 27, 1920. Serial No. 426,826.

*To all whom it may concern:*

Be it known that I, HERBERT B. McKAHIN, a citizen of the United States, residing at Moline, in the county of Rock Island and State of Illinois, have invented certain new and useful Improvements in Marker Devices for Planters, of which the following is a specification, reference being had therein to the accompanying drawing.

This invention relates to improvements in the "markers" forming parts of corn planter mechanisms; that is, the devices by which the guide lines are formed on the surface of the soil in parallelism with the path which the machine follows when in planting operation, each of which lines serves as a guide for the driver of the implement when it is making its next traverse across the field.

The marker heretofore has generally consisted of an arm several feet in length flexibly connected at its inner end to the planter frame, and at its outer end carrying a soil engaging device adapted to form a narrow shallow furrow as it is drawn by the machine through the surface part of the soil.

The object of the invention is to provide connecting devices which will hold the marker tool at all times in correct relation to the ground, and keep it in proper paths (as it swings to and from its operative position), without looseness or lost motion; and which are so arranged that the planter frame can vibrate laterally through long arcs around longitudinal axial lines, as in traveling over uneven ground, without its exerting sudden or severe strains on the inner end of the marker arm.

In the drawings;

Fig. 1 is a plan view of a planter mechanism having a pair of my improved marking devices attached thereto.

Fig. 2 is a rear view of the inner end part of the marker arm, and showing also the devices by which it is connected to the frame and by which its outer end can be elevated.

Fig. 3 is a view looking toward the side of the planter and showing in side elevation the parts indicated in Fig. 2.

The planter mechanism, proper, and as an entirety, may be of any of numerous sorts. The implement shown comprises a rear frame indicated as a whole by 1, and a front frame 2. The rear frame is mounted upon the axle 4 which, at its ends, carries the supporting and covering wheels 3, said frame comprising the side bars 5, the front bar 6 and the rear cross bar 7. The front frame comprises the tongue 8, and a cross frame element indicated, as an entirety, by 9, for supporting the seeders 10, 10, the runners, the seeder shaft 11, and the check heads 12. The rear frame is pivoted to the front frame in the usual way; the side bars 5, 5 of the frame being connected thereto by pivots at 13.

The drawings indicate that the usual chain mechanism and clutch device can be employed for taking power from the axle 4 to intermittently actuate the seeder shaft 11.

The two marker appliances are indicated, respectively, by 14 and 14'. They are similarly constructed and attached, each comprising an elongated arm adapted to extend several feet laterally from the side of the planter, and also devices for flexibly connecting the inner end to the planter frame, and devices for automatically guiding and causing the elevation of the arm as it moves to and from its operative position. Each arm is composed of a light rod element 15 and a sleeve or tubular element 16, the former being longitudinally slidable in the sleeve, for variation of total length, and adapted to be fastened after adjustment by clamping devices at 33.

At the inner end the sleeve element 16 is joined by the vertical hinge element 17 to the movable part 18 of the coupler or connecting device which mounts the marker on the planter frame. The part 18 is formed or provided with the said hinge pintle 17 and also with an expanded part 18. The latter is positioned between two lugs or ears 20, 20 formed with or carried by a stationary bar or plate 21 which is secured to the planter frame. A horizontal pintle element 19 holds the coupler 18 to the cam bar or plate 21, this pin being mounted in the lugs or ears 20. The bar 21 is rigidly fastened to the cross bar 22 secured to the rear part of the planter frame and extending across the machine from side to side, and positioned in a plane somewhat lower than the plane of the main frame bars 5, 5, 7. The hinge element on the arm 14 which is companioned to the hinge pintle 17 is an apertured bar formed with the part 23, the shank 23ª and the short rearward projecting extension 24 having a guide head or cam like part 25. This hinge element of the arm is secured thereto by inserting the shank 23ª into the sleeve like part 16 and securing it therein by rivets 26.

In the part 23 of the extension there is a vertical cone-shaped aperture 23ᵇ through which passes the hinge pintle 17. This aperture tapers or narrows upward, its diameter at the upper end permitting it to fit snugly to the pintle. As it flares or widens downward it permits the arm to vibrate in vertical planes and the pintle 17 permits it to swing horizontally. And as the coupler 18 is connected to the bar 21 by a horizontal pivot 19 the arm can move bodily around the axis of the pintle 19.

The bar or plate 21 extends rearward and at its outer end is formed with a lip or flange 27 having an inclined cam-like edge 27ª. This is at a radial distance from the pintle 17 equal to the distance of the guide head or cam 25 on the inner end of the arm from said pintle. Consequently, when the outer end of the arm swings horizontally forward the rearward projecting extension 24 impinges on the cam edge at 27ª and said extension serves as a short arm lever to lift the outer end of the arm up from the ground. The coupler 18 permits the pintle 17 to swing outward and liability for the breakage of the arm or connecting parts is obviated. But suitable stops are provided which prevent the coupler 18 and the pintle 17 from rocking inward.

The clamp collar 33 at the outer end of the sleeve part 16 of the marker arm is formed with an eye or hook 28 to which is attached a rope 29 that extends forward to and through a guide on the neighboring check head, and thence across the machine and to and through a similar guide on the other check head, and thence to the forward end of the opposite marker arm 14' to which the end of the rope is attached.

The two arms, 14 and 14', are similar to each other and the supporting and guiding devices at the inner end of one are similar to those at the inner end of the other, although some of them are positioned oppositely in direction.

The length of the rope 29 is such that when the arm 14 is extending outward and downward, and is in working position the outer end of the opposite arm 14' will be directed forward from its hinge and will be elevated above the ground; and the latter will be held up in its extreme position while the arm 14 is in operation.

At the outer end of the adjustable rod element 15 of each arm is the blade 30. It is formed by forging the metal at the outer end of the rod 15 into a peculiar shape; or it may be formed separately and rigidly fastened to the rod. This blade has a downward extending shank part 31 which widens transversely, and as it widens, is turned or twisted as shown so as to bring the forward approximately vertical face around toward the planter.

The outer end of the arm 14 can swing freely horizontally around the axis of the vertical hinge element 17, and it can also swing vertically within wide limits in the plane of the upper part of the aperture 23ᵇ. And the arm is susceptible of another movement, that is, of moving bodily around the hinge 19, the entire connecting or coupling device 18 swinging with it during such forward and backward movement.

Its outer end is automatically raised or lifted to an elevated plane when it is being drawn forward by the rope 29. This lifting is caused by the short lever arm 24 when its guide head or cam 25 impinges on the underside of the guide flange or lip 27. When the marker arm 14 approaches the position on the righthand side of the machine corresponding to that occupied by the arm 14', as shown in Fig. 1, the extension or short lever arm 24 swings the cam or head 25 backward and brings it to a position where it contacts with the lip or flange 27, and the latter being fixed, the parts 25 and 24 are forced downward. And they exert leverage upon the forward projecting part of the arm and cause its outer end to rise until it reaches its forward and uppermost position.

If at any time the righthand ground wheel 3 should come to a depression in the ground and move downward relatively to the left hand wheel the tendency for the exertion of downward pressure or strain on parts at the inner end of the marker arm is overcome as the pintle 17 is not only mounted in the conical bearing aperture at 23ᵇ but, moreover, can swing relatively outward around the axis of the pintle at 19.

I place the arm and its inward projecting extension 24, 25, so that the latter are positioned to bear upward against the cross bar 22, or a plate 22ᵇ secured to it, and the vertical play of the inner end of the arm is limited when the adjacent ground wheel 3 tends to relatively rise.

What I claim is:

1. In a planting mechanism of the class described, the combination with the planter frame, the stationary plate secured thereto and having a downward acting cam, and the horizontally and vertically swinging marker arm having a short lever extension at its inner end of the vertically swinging coupler having a vertically arranged hinge pintle pivotally connected to the marker arm and a horizontal hinge pintle connecting the coupler to the plate, the lever extension of the marker arm being adapted to engage with the said cam.

2. In a planting apparatus of the class described the combination with the planter frame, and the stationary plate secured thereto and having a downward acting cam of the normally vertical pintle arranged to swing vertically and the horizontally and vertically swinging marker arm pivotally connected to said pintle and carrying a relatively short lever adapted to engage with the said cam.

In testimony whereof, I affix my signature.

HERBERT B. McKAHIN.